Dec. 5, 1939.   L. S. LONGENECKER   2,182,498
METHOD OF INTRODUCING FUEL INTO AN OPEN HEARTH FURNACE
Original Filed Sept. 23, 1937   3 Sheets-Sheet 1
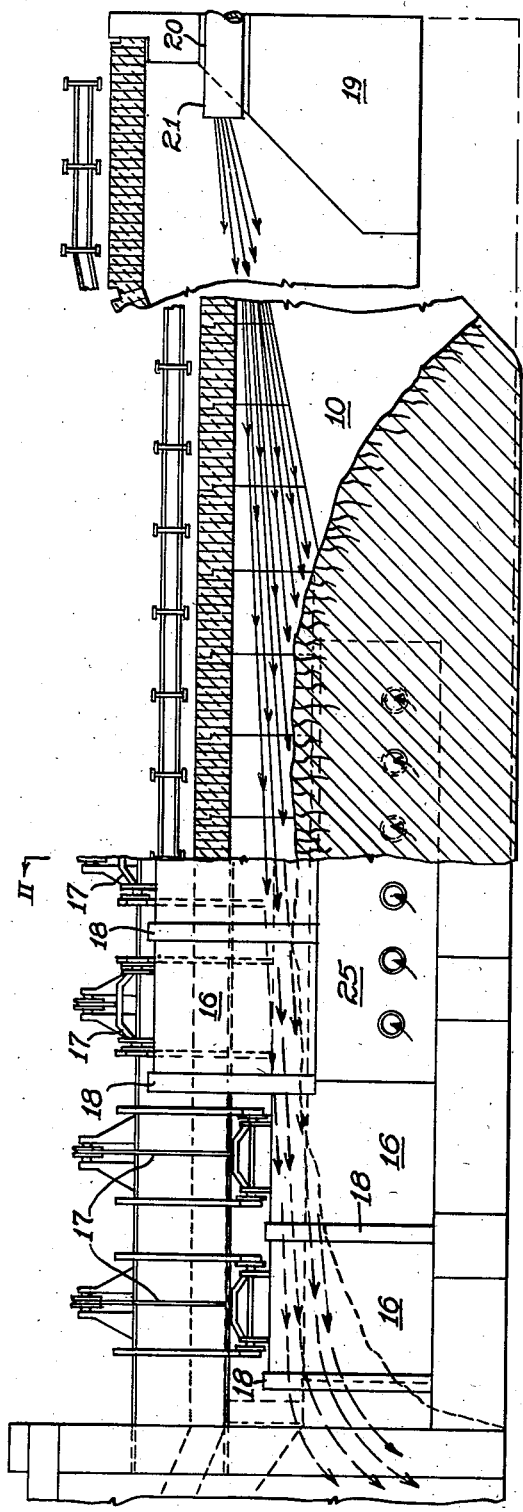
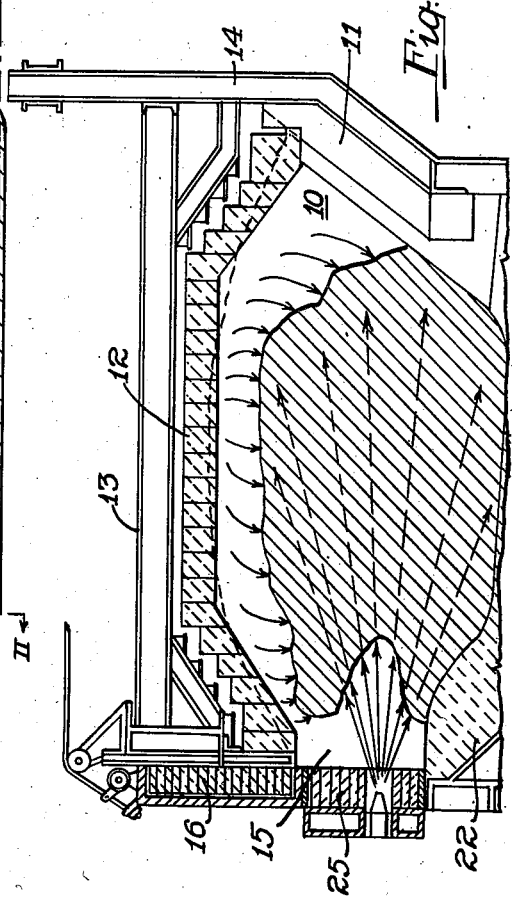
INVENTOR
Levi S. Longenecker
By Green & McCallister
His Attorneys Dec. 5, 1939.  L. S. LONGENECKER  2,182,498
METHOD OF INTRODUCING FUEL INTO AN OPEN HEARTH FURNACE
Original Filed Sept. 23, 1937   3 Sheets-Sheet 2
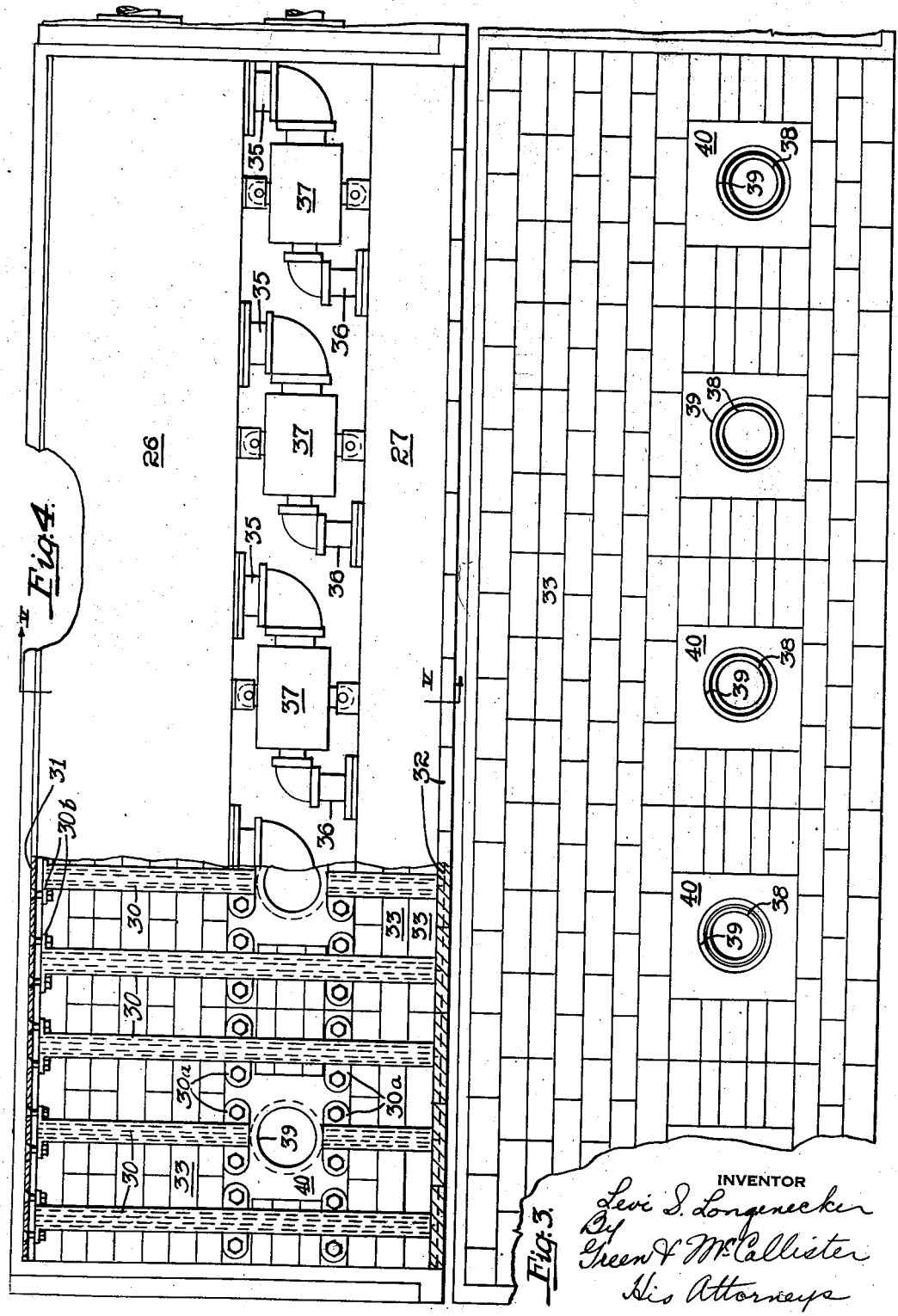
INVENTOR
Levi S. Longenecker
By Green & McCallister
His Attorneys Dec. 5, 1939.  L. S. LONGENECKER  2,182,498
METHOD OF INTRODUCING FUEL INTO AN OPEN HEARTH FURNACE
Original Filed Sept. 23, 1937  3 Sheets-Sheet 3
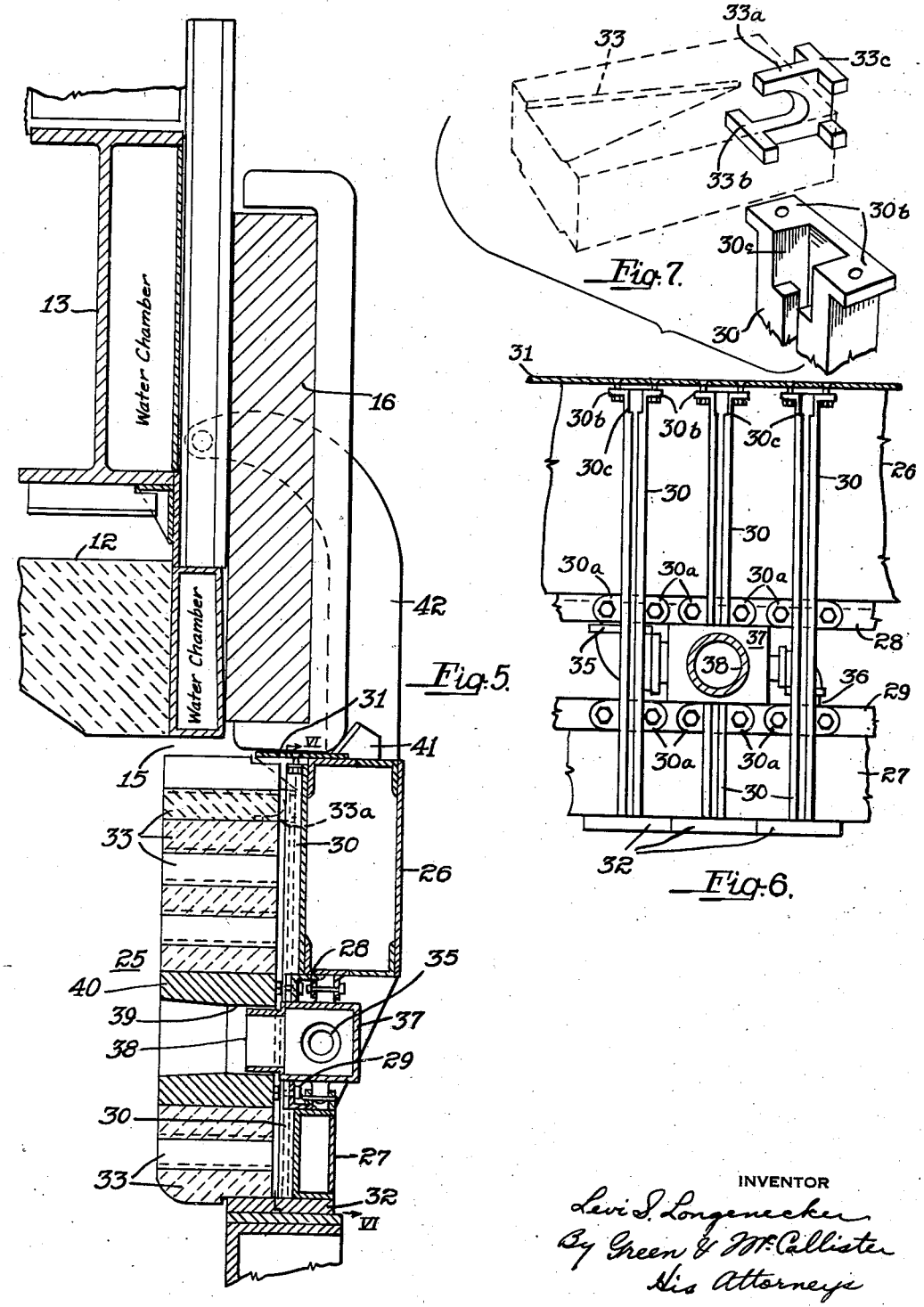
INVENTOR
Levi S. Longenecker
By Green & McCallister
His Attorneys Patented Dec. 5, 1939

2,182,498

UNITED STATES PATENT OFFICE 2,182,498

METHOD OF INTRODUCING FUEL INTO AN OPEN HEARTH FURNACE

Levi S. Longenecker, Mount Lebanon, Pa.

Original application September 23, 1937, Serial No. 165,254. Divided and this application March 9, 1939, Serial No. 260,717

11 Claims. (Cl. 75—43)

This is a division of an application filed by me on September 23, 1937 and Serially Numbered 165,254 and relates to a method of introducing fuel into metallurgical furnaces of the open hearth type.

In the making of steel in a metallurgical furnace of the open hearth type, there are two distinct phases or stages of operation. The first is the melting down stage in which the charge, such as steel scrap or other forms of steel, is reduced from a solid to a molten state, and the second stage in which the molten steel is refined. The furnace should be operated differently during the melting stage than it is during the refining stage, because, for efficient operation, a short, intense flame of the non-luminous or blow torch type, which will liberate the maximum amount of heat possible in a short distance of travel, is desirable to rapidly melt the charge, while in the refining stage a relatively long soft flame of the luminous type, which travels substantially the full length of the furnace and acts upon the delayed combustion principle in which the heat is liberated slowly, is desired to remove the impurities from the molten steel.

However, at the present time, to the best of my knowledge, all metallurgical furnaces of the open hearth type are fired during both the melting down stage and the refining stage, from conventional end ports which necessitates a long flame travel and the same burner arrangements—which project through the end ports—are used in each stage to direct the flame lengthwise of the furnace adjacent the roof or top arch thereof.

The primary object of this invention is to materially reduce the time required for the melting down of the charge and thus to increase the steel output of the furnace, and I accomplish this object by using a portable burner unit, as an auxiliary to the conventional end burners; and which is adapted to be installed in one or more of the charging openings in the side of the furnace and which has one or more burners therein for directing a flame or series of flames of the blow torch type directly against the charge in the furnace, whereby said flame or series of flames will tunnel into the charge and produce the equivalent of underfiring.

Another object of the invention is to provide a method of firing an open hearth furnace which will not only decrease the time required to melt the charge in the furnace and, consequently, increase the furnace tonnage, but will also reduce the fuel and maintenance costs of such furnace.

These and other objects which will hereinafter be made apparent to those skilled in this particular art I accomplish by the method described and illustrated herein.

In the drawings:

Figure 1 is a view partially in side elevation and partially in section, of a metallurgical furnace equipped with a portable burner for use in carrying out the method of this invention;

Fig. 2 is a sectional view taken on line II—II of Fig. 1;

Fig. 3 is a view in elevation of the furnace side of my portable burner unit;

Fig. 4 is an elevation of the outer side of the portable unit showing the fuel and air lines and the manifold arrangement of the burners and having a portion thereof broken away to show the refractory supporting members;

Fig. 5 is an enlarged sectional view showing the relation of my portable burner unit to the door of a furnace and is taken on the line V—V of Fig. 4;

Fig. 6 is a section taken on the line VI—VI of Fig. 5 and illustrates the frame of the portable burner unit and the refractory supporting members; and Fig. 7 is an exploded view in perspective of a refractory hanger and hanger supporting member of the portable burner unit.

In the drawings, 10 represents a metallurgical furnace of the open hearth type having a refractory back wall 11 and an arch or roof 12, which is suspended from a suitable metallic framework 13 carried by uprights 14. The back wall 11 is also carried by the uprights 14. The front wall of the furnace 10 is provided with a continuous and unobstructed charging opening 15 which extends substantially throughout the full length of the furnace. Charging opening 15 is normally closed by a series of refractory-lined doors 16 which are capable of being raised to open the charging opening and each door 16 is provided with a raising and lowering mechanism 17 of any desired construction. When the doors 16 are closed, the joints therebetween are sealed by members 18 which are adapted to be raised and lowered with the doors, and are so arranged that when two or more adjacent doors are opened, a continuous unobstructed opening into the furnace is provided, which is of a length substantially equal to the width of all the doors raised. The doors 16 and the seals 18 are preferably of the type illustrated in my United States Patent No. 2,045,662, dated June 30, 1936.

The ends of the furnace 10 are closed by end walls 19 having ports 20 therein for receiving burners 21 through which fuel is introduced into the furnace. The burners 21 are so positioned that the flames travel lengthwise of the furnace underneath the roof or arch 12, as is typical in present furnace construction. While only one end wall 19 is shown, it is understood that the other end wall is similar thereto and is likewise provided with a burner port.

The present invention relates particularly to a method of introducing fuel into open hearth furnaces and in carrying out such method I utilize a portable burner unit 25 which is adapted to be placed in the charging opening 15 for directing a flame of the blow torch type directly against a charge which has been previously introduced through the charging opening 15 and which rests on the furnace hearth 22. While the portable burner unit 25 may be of any desired length, I prefer to make it of a length substantially equal to the width of one or a multiple of doors, so that when the unit is positioned in the furnace, the ends of the unit will abut against the edges of the doors adjacent thereto without leaving any substantial opening or space therebetween.

Portable burner unit 25 comprises, in general, an outer metallic frame which supports a series of refractory blocks forming the inner or furnace side of the unit. The frame is of built up construction and includes an air duct 26, a fuel duct 27—both of which extend lengthwise of the unit adjacent the top and bottom thereof, respectively—angle irons 28 and 29 attached to the bottom of the air duct and top of the fuel duct, respectively, and a series of vertically extending and horizontally spaced castings 30 having ears 30a which are bolted to the angle irons. The top of the air duct 26, which is built up of angles and plates welded together, is welded to a plate 31 which, in turn is bolted to lugs 30b on the sides of the castings 30, and the bottom of the fuel duct 27, which as shown is of built up construction and is supported on the feet 32 of the castings 30. Castings 30 are preferably of substantially closed channel shape in section and have their inner faces adjacent the top thereof cut away, as at 30c, to provide access to the interior of the castings, whereby refractories 33 may be suspended from the castings 30 by means of hangers 33a which have a refractory engaging portion 33b and a head 33c adapted to slide in the casting 30. Refractories 33 are preferably of the interlocking type and the bottom tier thereof is supported directly on the feet 32 of the castings 30.

Pipes 35 and 36 are respectively connected to the air duct 26 and the fuel duct 27, at any desired intervals along the length thereof, for establishing communication between said ducts and a series of burners 37. The fuel and air delivered to each burner 37 are mixed together therein and directed into a burner collar 38—one for each burner—which extends into a port 39 in a refractory burner block 40.

In carrying out the method of this invention in the manufacture of steel in an open hearth furnace, a steel forming charge, such as scrap or other suitable material, is introduced into the furnace 10 through the charging opening 15—the doors 16 then being raised—and piled on the hearth 22 of the furnace. After the furnace has been charged, one or more doors 16 carrying with them the seals 18 and having a combined width equal to the length of the burner unit 25, are raised and the burner unit 25 is then placed in the charging opening 15 with the ends thereof abutting against the sides of the closed doors at each end thereof and the bottom supported on the sill of the charging opening.

With the burner unit 25 in this position, the open doors 16 are lowered into engagement with the top of the burner unit to seal the same. Members 41 having beveled inner surfaces are provided on the top of the burner unit and are adapted to engage and cooperate with the bottoms of the doors 16 to guide the same to proper sealing position on the unit. The portable burner unit 25 is also provided at each end with an upwardly and inwardly projecting member 42. These members are adapted to engage the front of the furnace and aid in holding the unit in proper position within the charging opening 15.

After the portable burner unit 25 has been positioned in the charging opening 15 and the doors 16 lowered to seat on the top thereof, the air duct 26 and the fuel duct 27 are connected to suitable sources of air and fuel, respectively, whereby fuel and air are delivered through pipes 35—36 to the manifolds 37 and directed into the burners 38. Since the fuel and air are premixed, a blow torch-like flame issues from each burner. These burners are so spaced that a ribbon-like flame is provided and directed on the face of the charge exposed to the charging opening 15. At the same time, flames from the end port burners 21 are directed lengthwise of the furnace to heat the top of the charge and the roof or arch of the furnace. If desired, air and fuel ducts 26 and 25 of the portable unit 25 may be connected to the same source of supply as the end port burners 21 whereby a portion of the fuel delivered to the end ports will be diverted to the burners 38, or, the ducts 26—27 may be connected to auxiliary sources of supply whereby additional fuel will be introduced into the furnace through the burners 38.

By using my portable burner unit in connection with a furnace during the melt-down stage, a series of short intense flames of the blow torch type are directed from the side of the furnace directly into contact with the charge on the furnace hearth. These cut tunnels into the charge and provide a condition equivalent to underfiring the charge.

As the charging opening 15 is below the end port burners 21, it is apparent that the high velocity flames entering the furnace through the burners 38 will be below the flames issuing from the end port burners 21 and will travel at substantially right angles to the end port flames. Consequently, the flame from the end port burners not only acts as a shield and prevents the high velocity blow torch-like flames from burners 38 from impinging against the furnace arch but aids in confining such flames to the charge.

After the melt-down has been completed, the portable unit 25 is removed from the furnace, the doors 16 are closed and the refining procedure is carried on in the usual manner; the flames for the refining period being restricted entirely to the end burners 21.

It will be apparent from the foregoing that by means of my method, the speed of melting down a charge in the furnace is not only materially increased but a shorter length of time is required for the melt-down and, consequently, the steel output of the furnace is materially increased.

It will also be apparent, since the portable unit is used only during the melting down period and is removed from the furnace during the refining stage, that one set of portable units may be used to take care of several furnaces. Since the burners are removed when not in use, wear and tear on the burners and the wall exposed to the hot inside temperature of the furnace is eliminated.

While I have illustrated the air duct 26, fuel duct 27, the angles 28—29 and members 30 as forming the structural steel framework on which the refractory tiles, castings and burners are supported, it is to be understood that any type of framework may be employed for supporting the refractories and that the ducts for introducing the gas and air to the burner may be attached to the framework in any desired manner without departing from my invention. Further, it should be noted that when the portable unit has been positioned in the charging opening 15, it may be tilted forward or backward to vary its vertical position by merely placing wedges between the bottom of the unit and the sill of the charging opening, to direct the ribbon-like flames issuing from the burners 38 against the charge in any desired direction.

It should be understood that while I have disclosed my method in connection with the operation of an open hearth furnace having a continuous and unobstructed charging opening in the front wall thereof, it may also be practiced in connection with the conventional type of open hearth furnace in which the front wall thereof is provided with a plurality of door openings separated by door jambs. In the conventional type of furnace, individual doors are employed for closing the openings defined by the door jambs in the front wall thereof. When my portable burner unit is to be used with such conventional type of furnace, the unit is made of a width substantially equal to the width of the door opening and one unit is installed in each door opening or in as many of the door openings as may be desired.

Having thus described my invention, what I claim as new and desire to secure by Letters Patent is:

1. In an open hearth steel method, the steps of melting down a charge by intense flame of low luminosity directed against at least one side of the charge and refining with luminous flame alternately directed from opposite ends lengthwise of the furnace.

2. In an open hearth furnace method, the steps of melting down a charge with a series of intense flames of relatively low luminosity directed transversely of the furnace and against at least one side of the charge and refining with relatively soft high luminosity flame alternately directed from opposite ends lengthwise of the furnace.

3. In the art of open hearth steel manufacture, the steps comprising melting the charge by means of substantially non-luminous relatively intense flame directed transversely of the furnace and into the side of the charge and refining by means of soft relatively luminous flame alternately directed from opposite ends lengthwise of the furnace.

4. In the art of open hearth steel manufacture, the steps comprising melting the charge by a series of relatively short intense non-luminous flames projected transversely of the furnace and into the side of the charge, and refining by relatively soft luminous flame directed longitudinally of the furnace, first from one end and then from the other end thereof.

5. In the art of making steel in an open hearth furnace, the steps which comprise depositing a charge upon the furnace hearth, subjecting the charge to the action of a short intense flame directed against the side of the charge, and simultaneously therewith in subjecting the charge to the action of a flame of the delayed combustion type directed longitudinally of the furnace and between the furnace roof and such charge.

6. In the art of making steel in an open hearth furnace, the steps which comprise depositing a charge upon the furnace hearth, in subjecting the charge to the action of a short intense flame directed into one side of the charge, and simultaneously therewith in subjecting the charge to the action of a flame of the delayed combustion type directed longitudinally of the furnace above such charge.

7. In the art of making steel in an open hearth furnace, the steps which comprise feeding a charge in a solid state onto the hearth of such a furnace, melting such charge by directing a non-luminous flame into the side thereof and simultaneously therewith in directing a luminous flame over the top of said charge and at right angles to said non-luminous flame to confine the non-luminous flame to the charge and prevent it from impinging against the furnace roof, in extinguishing said non-luminous flame and continuing the luminous flame to refine the molten metal.

8. In the art of making steel in an open hearth furnace, the steps which comprise depositing a charge on the hearth of such a furnace, directing a short non-luminous flame directly against a side of said charge and simultaneously therewith in directing a long luminous flame between the furnace arch and the top of the charge.

9. In the art of making steel in an open hearth furnace, the steps which comprise charging such furnace, subjecting such charge to the action of two flames, one of which passes along the top of the charge and the other of which impinges against the side of the charge, extinguishing the side impinging flame after the melt down and continuing the other to refine the molten metal.

10. In the art of making steel in an open hearth furnace, the steps which comprise directing a high velocity blow torch-like flame into such a furnace from at least one side thereof, and confining such flame to the charge by blanketing the charge with a soft low-velocity flame directed into said furnace from at least one end thereof.

11. A method of melting and refining a charge in an open hearth furnace, which comprises melting down a charge by intense flame of high velocity directed against at least one side of the charge, blanketing the furnace roof to protect the same against the effect of said intense flame by a luminous flame of the delayed combustion type alternately directed from opposite ends lengthwise of the furnace and between said roof and the furnace charge, and in refining the melted down charge by said luminous delayed combustion type of flame.

LEVI S. LONGENECKER.